United States Patent
Teoh

(10) Patent No.: US 9,176,554 B2
(45) Date of Patent: Nov. 3, 2015

(54) POWER MANAGEMENT IN A BRIDGE BASED ON A SECOND DERIVATIVE VALUE DERIVED FROM A MATHEMATICAL DERIVATIVE OF PLURALITY OF VALUES CORRESPONDING TO THE RECEIVED PACKETS

(71) Applicant: Intel Corporation, Santa Clara, CA (US)

(72) Inventor: Poh Thiam Teoh, Seri Damansara (MY)

(73) Assignee: Intel Corporation, Santa Clara, CA (US)

( * ) Notice: Subject to any disclaimer, the term of this patent is extended or adjusted under 35 U.S.C. 154(b) by 283 days.

(21) Appl. No.: 13/631,868

(22) Filed: Sep. 29, 2012

(65) Prior Publication Data

US 2013/0091365 A1    Apr. 11, 2013

(30) Foreign Application Priority Data

Sep. 30, 2011    (MY) .......................... PI 2011004720

(51) Int. Cl.
*G06F 1/00* (2006.01)
*G06F 1/26* (2006.01)
*G06F 1/32* (2006.01)

(52) U.S. Cl.
CPC .............. *G06F 1/266* (2013.01); *G06F 1/3253* (2013.01); *G06F 1/26* (2013.01); *G06F 1/3203* (2013.01); *Y02B 60/1217* (2013.01); *Y02B 60/1235* (2013.01)

(58) Field of Classification Search
CPC ...... G06F 1/3203; G06F 1/26; Y02B 60/1217
See application file for complete search history.

(56) References Cited

U.S. PATENT DOCUMENTS

| | | | |
|---|---|---|---|
| 2002/0093917 A1* | 7/2002 | Knobbe et al. | 370/252 |
| 2004/0163000 A1* | 8/2004 | Kuhlmann et al. | 713/300 |
| 2006/0221831 A1 | 10/2006 | Wadekar et al. | |
| 2006/0288349 A1 | 12/2006 | Zimmer et al. | |
| 2007/0036096 A1* | 2/2007 | Sinivaara | 370/318 |
| 2007/0206621 A1 | 9/2007 | Plamondon et al. | |

(Continued)

FOREIGN PATENT DOCUMENTS

| | | |
|---|---|---|
| CN | 101854294 A | 10/2010 |
| WO | 2013/048927 A1 | 4/2013 |
| WO | 2013/048943 A1 | 4/2013 |

OTHER PUBLICATIONS

International Preliminary Report on Patentability and Written Opinion received for PCT Patent Application No. PCT/US2012/056823, mailed on Apr. 10, 2014, 5 pages.

(Continued)

*Primary Examiner* — Jaweed A Abbaszadeh
*Assistant Examiner* — Gayathri Sampath
(74) *Attorney, Agent, or Firm* — Alpine Technology Law Group LLC

(57) ABSTRACT

Methods and apparatus relating to robust governing of power management infrastructure in a bridge design are described. In one embodiment, a first agent (such as a processor core) is coupled to a second agent (such as an input/output device) via a bridge. The bridge may or may not enter a different power management state from a current power management state based on a second derivative value. The second derivative value may be in turn determined based on a plurality of first derivative values corresponding to received packets Other embodiments are also disclosed and claimed.

20 Claims, 8 Drawing Sheets

(56) References Cited

U.S. PATENT DOCUMENTS

| | | |
|---|---|---|
| 2009/0168767 A1 | 7/2009 | Anders et al. |
| 2009/0235101 A1 | 9/2009 | Hisamatsu |
| 2010/0246591 A1 | 9/2010 | Gobriel et al. |
| 2010/0325257 A1 | 12/2010 | Goel et al. |
| 2011/0153924 A1 | 6/2011 | Vash et al. |
| 2011/0161702 A1 | 6/2011 | Conrad et al. |
| 2013/0086400 A1 | 4/2013 | Teoh |

OTHER PUBLICATIONS

International Preliminary Report on Patentability and Written Opinion received for PCT Patent Application No. PCT/US2012/056851, mailed on Apr. 10, 2014, 7 pages.

International Search Report and Written Opinion received for PCT Patent Application No. PCT/US2012/056823, mailed on Mar. 4, 2013, 4 pages.

International Search Report and Written Opinion received for PCT Patent Application No. PCT/US2012/056851, mailed on Feb. 28, 2013, 8 pages.

Birrell, Andrew; "'Libmc': a Multi-core Library for Beehive", Aug. 9, 2010, 8 pages.

Office Action received for Chinese Patent Application No. 201280047841.7, mailed on Aug. 19, 2015, 25 pages including 14 pages of English translation.

* cited by examiner

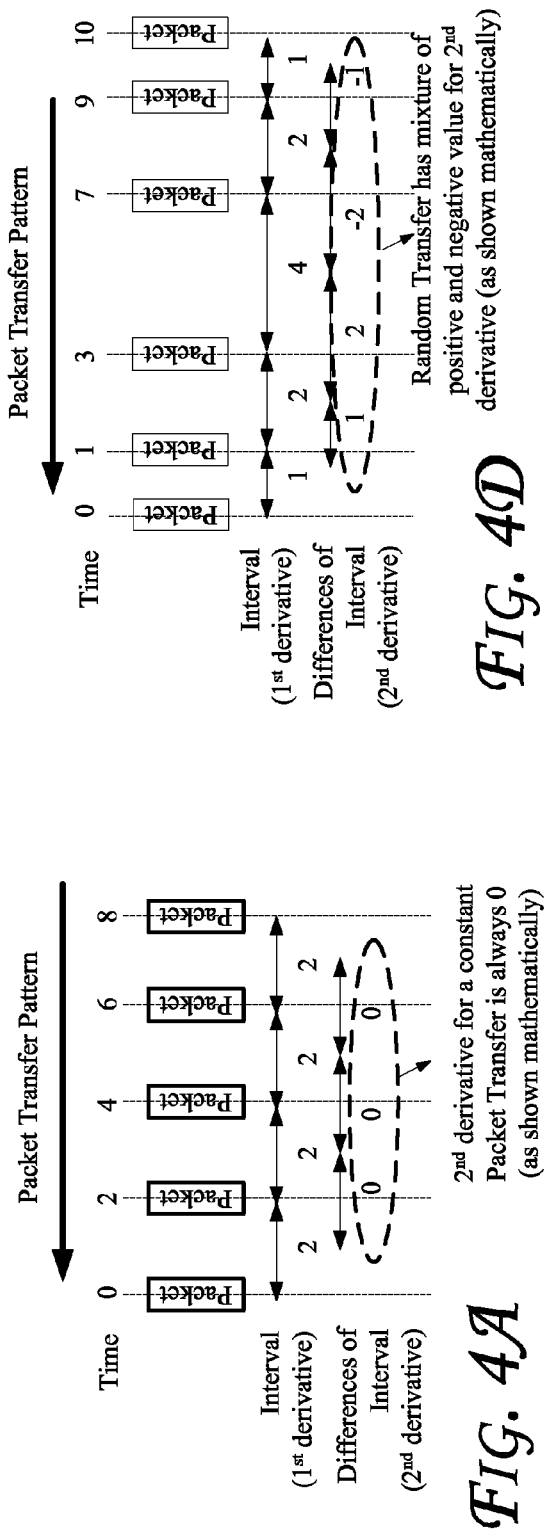
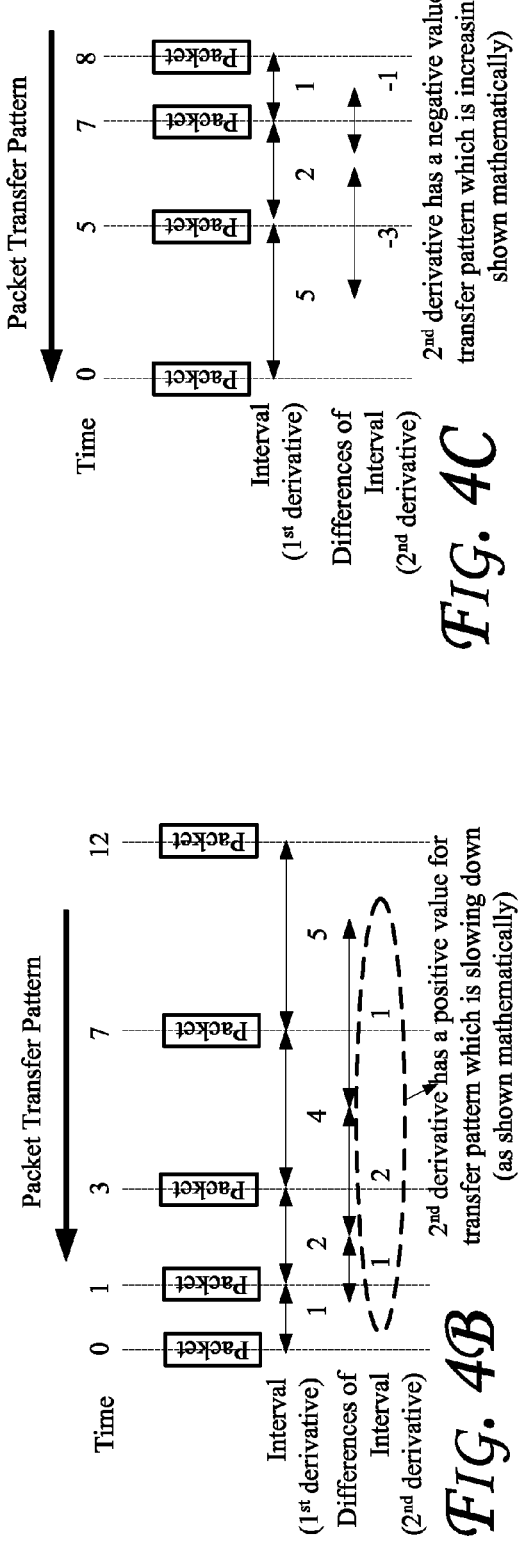
FIG. 4A
FIG. 4B
FIG. 4C
FIG. 4D

US 9,176,554 B2

POWER MANAGEMENT IN A BRIDGE BASED ON A SECOND DERIVATIVE VALUE DERIVED FROM A MATHEMATICAL DERIVATIVE OF PLURALITY OF VALUES CORRESPONDING TO THE RECEIVED PACKETS

CROSS REFERENCE TO RELATED APPLICATIONS

This application claims priority to Malaysian patent application PI2011004720 filed on Sep. 30, 2011 (which is incorporated herein by reference in its entirety).

FIELD

The present disclosure generally relates to the field of electronics. More particularly, some embodiments relate to robust governing of power management infrastructure in a bridge design.

BACKGROUND

One common interface used in computer systems is Peripheral Component Interconnect (PCI) Express ("PCIe", in accordance with PCI Express Base Specification 3.0, Revision 0.5, August 2008). In today's bridge designs (such as PCI Bridges), power management may be triggered using an "idle timeout counter" mechanism. A timeout counter may generally represent a static guessing mechanism that has no real correlation with the actual traffic activities. For example, the timeout counter mechanism may be solely based on the idle period between two packets.

However, the consequences of a wrong value for idle timeout counter to trigger power management in a bridge may either cause a performance impact with no power saving at all or even hardware compliancy issues. Therefore, to avoid such issues, the timeout counter is usually programmed with a large value for pessimistic and safe guard reasons. But, a large timeout value would in turn directly penalized power saving opportunity.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

FIGS. 4A-4D illustrate packet transfer pattern and first and second interval value correlations, according to some embodiments.

DETAILED DESCRIPTION

In the following description, numerous specific details are set forth in order to provide a thorough understanding of various embodiments. However, some embodiments may be practiced without the specific details. In other instances, well-known methods, procedures, components, and circuits have not been described in detail so as not to obscure the particular embodiments. Various aspects of embodiments of the invention may be performed using various means, such as integrated semiconductor circuits ("hardware"), computer-readable instructions organized into one or more programs ("software") or some combination of hardware and software. For the purposes of this disclosure reference to "logic" shall mean either hardware, software, or some combination thereof.

Some embodiments provide a novel and/or robust mechanism which allows a bridge to determine the traffic activity during a period of time. Using this information, a bridge may more accurately predict or determine whether it should trigger any power management features. As discussed herein, a "bridge" generally refers to a device that includes logic to forward information (e.g., in the form of packets) from a source agent to one or more destination agents in a computing system. Embodiments discussed herein are not limited to a single type of bridge design and may be utilized by any bridge design, such as a Platform Controller Hub (PCH) switch, a PCIe switch, a PCI Bridge, an Advanced High-performance Bus (AHB) bridge, etc. Moreover, some embodiments discussed herein may be utilized on multi-socket/multi-processor platforms (e.g., using point-to-point coherent interconnects such as QPI (Quick Path Interconnect)).

For example, one embodiment enables a bridge to transpose or translate various traffic patterns into algorithm functions that may be further calculated into usable/meaningful values as will be further discussed herein. In an embodiment, arithmetic calculation may be used including obtaining the function of the packet durations and/or calculation of the first and second derivative variables. In an embodiment, the computations may be simplified, e.g., to make the hardware design simpler (i.e., with low gate count) and/or adaptable to any bridge design. In some embodiments, a bridge may use these techniques to trigger any power management feature directly, e.g., bypassing other intermediate stages (i.e., instead of the typical "staged" power management where the lowest Power Saving (lowest latency) is triggered followed by a higher power management after a longer period of idle is detected).

In various embodiments, a bridge (such as a PCI Express switch component, PCI bridges, AHB bridges, etc.) may utilize one or more of techniques discussed herein to lower the power consumption (e.g., by predicting and applying an appropriate power management scheme and/or staying in a lower power state for a longer time period), without compromising compliancy and/or performance.

Figure 1:
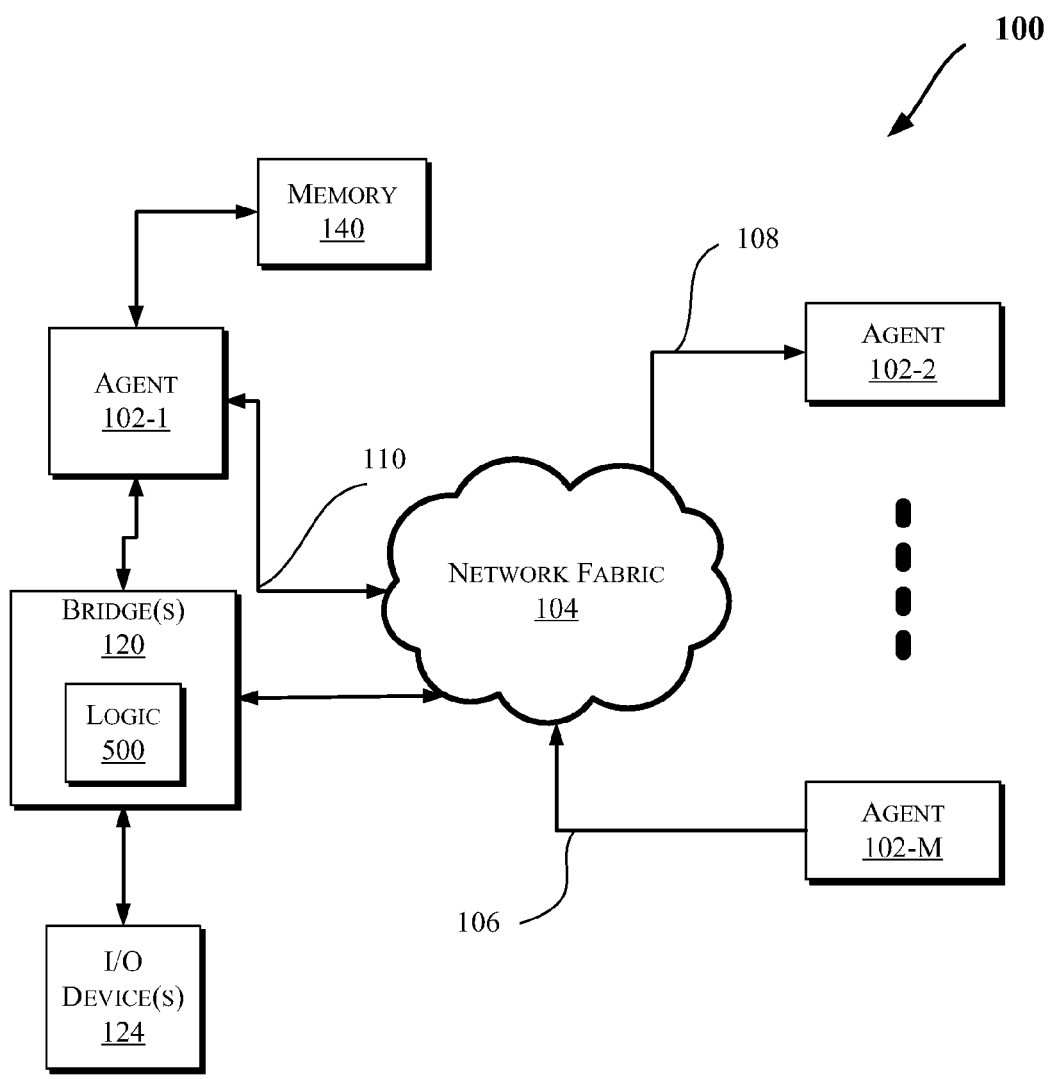
FIGS. 1-2 and 7-8 illustrate block diagrams of embodiments of computing systems, which may be utilized to implement various embodiments discussed herein.

Various embodiments are discussed herein with reference to a computing system component, such as the components discussed herein, e.g., with reference to FIGS. 1-2 and 7-8. More particularly, FIG. 1 illustrates a block diagram of a computing system 100, according to an embodiment of the invention. The system 100 may include one or more agents 102-1 through 102-M (collectively referred to herein as "agents 102" or more generally "agent 102"). In an embodiment, the agents 102 may be components of a computing system, such as the computing systems discussed with reference to FIGS. 2 and 7-8.

As illustrated in FIG. 1, the agents 102 may communicate via a network fabric 104. In an embodiment, the network fabric 104 may include one or more interconnects (or interconnection networks) that communicate via a serial (e.g., point-to-point) link and/or a shared communication network.

For example, some embodiments may facilitate component debug or validation on links that allow communication with fully buffered dual in-line memory modules (FBD), e.g., where the FBD link is a serial link for coupling memory modules to a host controller device (such as a processor or memory hub). Debug information may be transmitted from the FBD channel host such that the debug information may be observed along the channel by channel traffic trace capture tools (such as one or more logic analyzers).

In one embodiment, the system 100 may support a layered protocol scheme, which may include a physical layer, a link layer, a routing layer, a transport layer, and/or a protocol layer. The fabric 104 may further facilitate transmission of data (e.g., in form of packets) from one protocol (e.g., caching processor or caching aware memory controller) to another protocol for a point-to-point network. Also, in some embodiments, the network fabric 104 may provide communication that adheres to one or more cache coherent protocols.

Furthermore, as shown by the direction of arrows in FIG. 1, the agents 102 may transmit and/or receive data via the network fabric 104. Hence, some agents may utilize a unidirectional link while others may utilize a bidirectional link for communication. For instance, one or more agents (such as agent 102-M) may transmit data (e.g., via a unidirectional link 106), other agent(s) (such as agent 102-2) may receive data (e.g., via a unidirectional link 108), while some agent(s) (such as agent 102-1) may both transmit and receive data (e.g., via a bidirectional link 110).

Also, in accordance with an embodiment, one or more of the agents 102 may be coupled through one or more bridges 120. As will be further discussed below, the bridge(s) 120 may include logic 500 to trigger various power management features. As shown in FIG. 1, the bridge(s) 120 may facilitate communication between an agent (e.g., agent 102-1 shown) and one or more Input/Output ("I/O" or "IO") devices 124 (such as PCI Express I/O devices). In an embodiment, the bridge(s) 120 may include logic to couple and/or facilitate communication between components of the agent 102-1 (such as a processor and/or memory subsystem) and the I/O devices 124, e.g., in accordance with PCI Express specification or other specifications. Also, while logic 500 is illustrated in FIG. 1 to be inside the bridge(s) 120, it may be located elsewhere in system 100.

As illustrated in FIG. 1, the agent 102-1 may have access to a memory 140. As will be further discussed with reference to FIGS. 2-8, the memory 140 may store various items including for example an OS, a device driver, etc.

Figure 2:
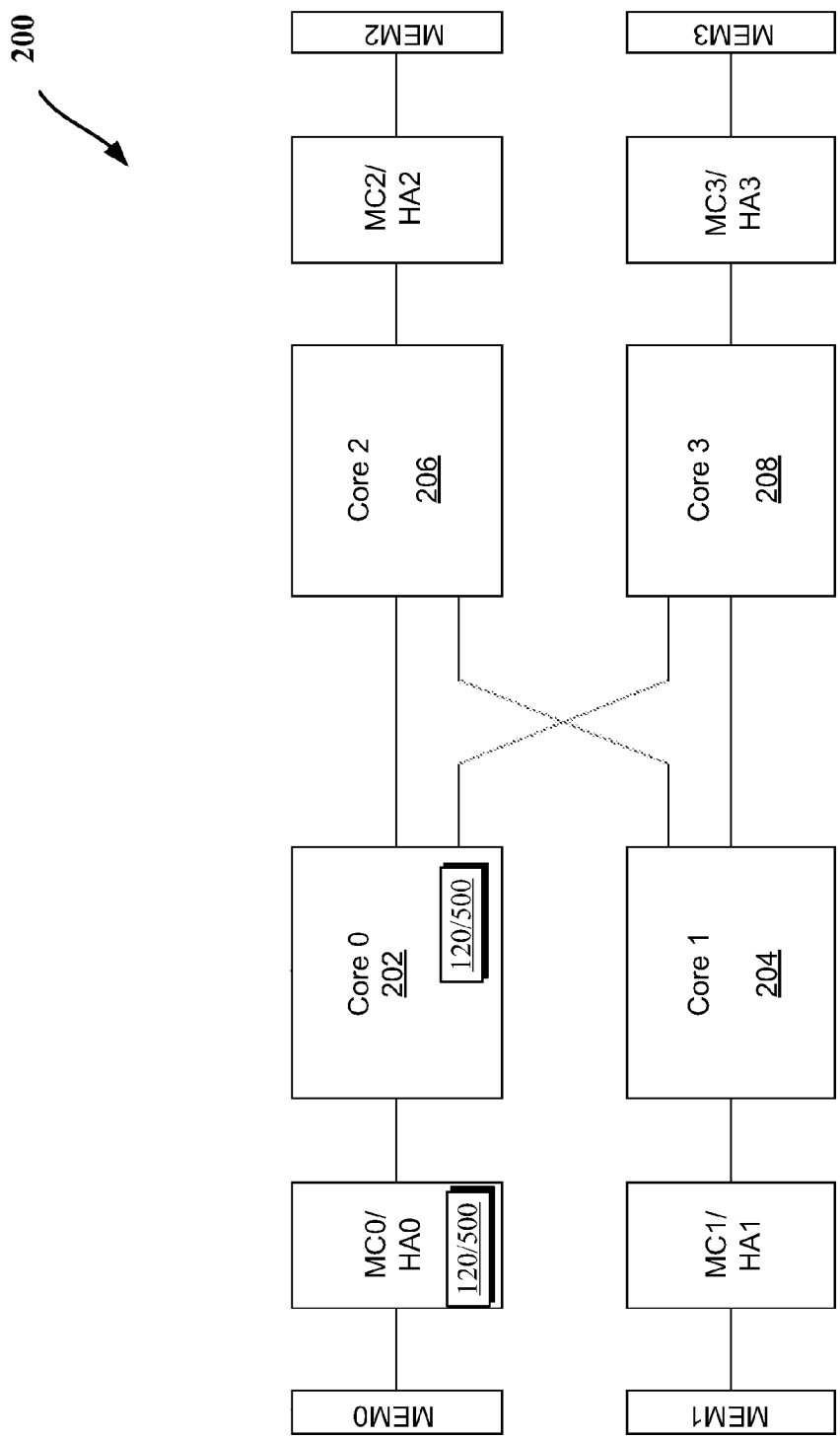

More specifically, FIG. 2 is a block diagram of a computing system 200 in accordance with an embodiment. System 200 may include a plurality of sockets 202-208 (four shown but some embodiments may have more or less socket). Each socket may include (or otherwise be coupled to) a processor and one or more of bridge(s) 120. In some embodiments, bridge(s) 120 may be present in one or more components of system 200 (such as those shown in FIG. 2). However, more or less 120 blocks may be present in a system depending on the implementation.

Additionally, each socket may be coupled to the other sockets via a point-to-point (PtP) link, such as a Quick Path Interconnect (QPI). As discussed with respect the network fabric 104 of FIG. 1, each socket may be coupled to a local portion of system memory, e.g., formed by a plurality of Dual Inline Memory Modules (DIMMs) that may include dynamic random access memory (DRAM).

As shown in FIG. 2, each socket may be coupled to a Memory Controller (MC)/Home Agent (HA) (such as MC0/HA0 through MC3/HA3). The memory controllers may be coupled to a corresponding local memory (labeled as MEM0 through MEM3), which may be a portion of system memory (such as memory 712 of FIG. 7). In some embodiments, the memory controller (MC)/Home Agent (HA) (such as MC0/HA0 through MC3/HA3) may be the same or similar to agent 102-1 of FIG. 1 and the memory, labeled as MEM0 through MEM3, may be the same or similar to memory devices discussed with reference to any of the figures herein. Generally, processing/caching agents may send requests to a home node for access to a memory address with which a corresponding "home agent" is associated. Also, in one embodiment, MEM0 through MEM3 may be configured to mirror data, e.g., as master and slave. Also, one or more components of system 200 may be included on the same integrated circuit die in some embodiments.

Furthermore, one implementation (such as shown in FIG. 2) may be for a socket glueless configuration with mirroring. For example, data assigned to a memory controller (such as MC0/HA0) may be mirrored to another memory controller (such as MC3/HA3) over the PtP links.

Figure 3A:
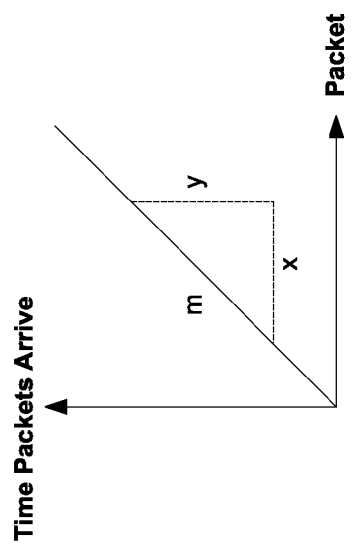
FIGS. 3A-3C illustrate graphs in accordance with some embodiments.
Figure 3B:
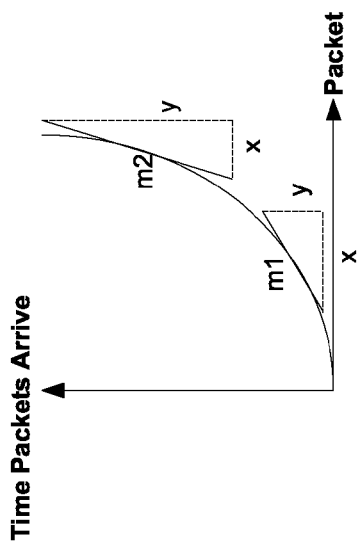
Figure 3C:
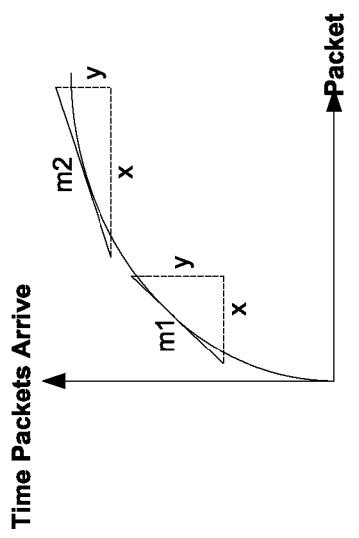

FIGS. 3A-3C illustrate graphs associated with mathematical functions generated based on the relationship of the time packets arrive at a bridge versus packets, in accordance with some embodiments. If the bridge utilization is constant (where each packet transmitted arrives at a constant interval), then the function is a linear function as shown in FIG. 3A (where "m" refers to the slope of the curve). If bridge utilization is damping, where each successive packet transmitted arrives with a successively larger interval, then the function is as shown in FIG. 3B (where m1 and m2 refer to slopes). If bridge utilization is increasing, where each successive packet transmitted arrives with a successively smaller interval, then the function is as shown in FIG. 3C (where m1 and m2 refer to slopes).

Knowing that "m" refers to the slope of a function, then m is:

$$dy/dx=m,$$

when dx is constant (i.e., 1), delta "y" (dy) is proportional with "m"

In the case of the second derivative being discrete:

$$d^2y/dx^2=dy_1/dx_1-dy_2/dx_2$$

$$d^2y/dx^2=m_1-m_2$$

$$d^2y/dx^2=(y_2-y_{2'})/(x_2-x_{2'})-(y_1-y_{1'})/(x_1-x_{1'})$$

Set $(x_1-x_{1'})=1$ and $(x_2-x_{2'})=1$; this is always true because we are measuring per Packet on x, therefore:

$$d^2y/dx^2=(y_2-y_{2'})-(y_1-y_{1'})$$

Therefore for a hardware implementation, the functions chosen is listed below in accordance with an embodiment:

$$d^2y/dx^2=(y_2-y_1)-(y_1-y_{1'})$$

$$d^2y/dx^2=(\Delta y_2)-(\Delta y_1)$$

Accordingly, the arithmetic calculation that a bridge needs to monitor is the "differences between packet interval of the arrival period". In various embodiments, the differences may be determined without software interventions and in simplified hardware, thus increasing speed and reducing latency.

Referring to FIGS. 4A-4D, packet transfer pattern and first and second interval value correlations are shown, according to some embodiments. More particularly, FIG. 4A shows the first and second derivatives of a constant or steady packet transfer pattern. FIG. 4B shows the first and second derivative of a slowing traffic pattern. FIG. 4C shows the first and second derivative of a increasing traffic pattern. FIG. 4D shows the first and second derivative of a random traffic pattern.

Figure 5:
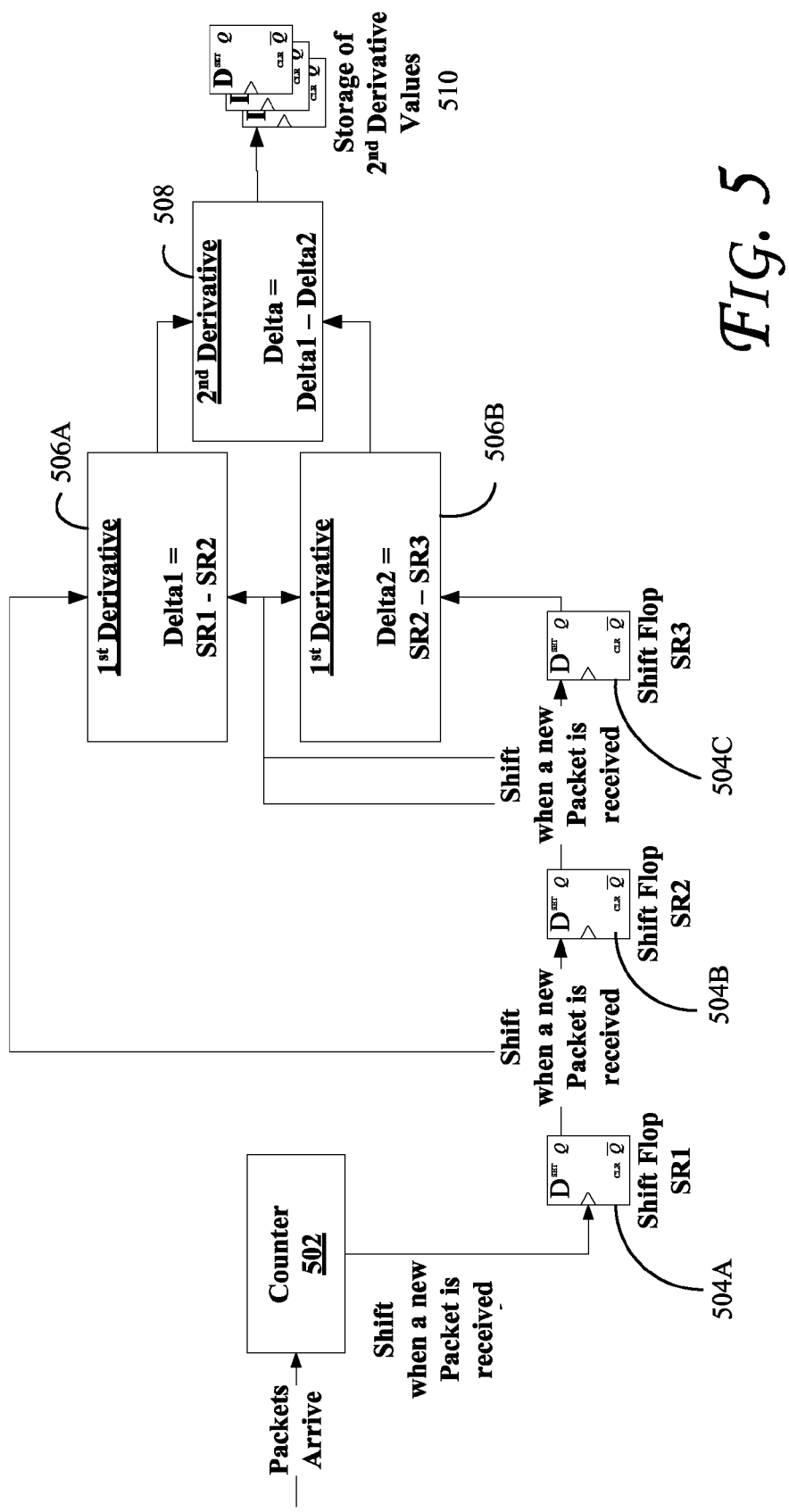
FIG. 5 illustrates a block diagram of a logic that determines the first derivative and second derivative value corresponding to bridge activity, according to an embodiment.

FIG. 5 illustrates a block diagram of a logic 500 that determines the first derivative and second derivative value corresponding to bridge activity, according to an embodiment. As previously discussed, logic 500 may be provided in a bridge or elsewhere in a computing system, depending on the implementation.

As illustrated in FIG. 5, logic 500 may include a Counter 502, Shift Registers (SRs) 504A-504C (which may be data latches in some embodiments such as shown in FIG. 5), Arithmetic minus logics 506A-506C and 508, and storage devices 510 for second Derivative values. The Counter 502 resets (e.g., to "zero") whenever there is a new packet received. When there is no incoming packet, the Counter 502 will continue to count up (e.g., for each clock cycle). However, depending on the implementations, different counter designs may be utilized (including Ring counter or Johnson counter). When there is a new packet received, the current value of the counter will be shift to Shift Register 1 (SR1) 504A, while the value of Shift Register 2 (SR2) 504B will be shift to Shift Register 3 (SR3) 504C. At the same time, the first level of minus logics 506A and 506B will calculate the differences between the interval of the packets received. The second level of minus logic 508 will calculate the second derivative value. One or more of the second derivative values may be stored in device(s) 510, e.g., based on the usage model and/or the accuracy of traffic needed on the platform. If the bridge (e.g., including logic 500 or being coupled thereto such as the bridge 120) continuously detects a positive value of the second derivative value, this indicates that the bridge traffic is slowing down; hence, there is a good chance for a power management feature to be triggered. The logic could also use the second derivative value to trigger different power management features as bridge now knows how slow the traffic has dampen. For example, with the value stored (2nd derivative values), the bridge hardware is able to recognize whether the bridge is receiving less traffic and trigger the appropriate power management. In an embodiment, the bridge may potentially trigger a higher level power management based on the 2nd derivative values directly, e.g., bypassing other intermediate stages (i.e., instead of the typical "staged" power management where the lowest Power Saving (lowest latency) is triggered followed by a higher power management after a longer period of idle is detected).

Figure 6:
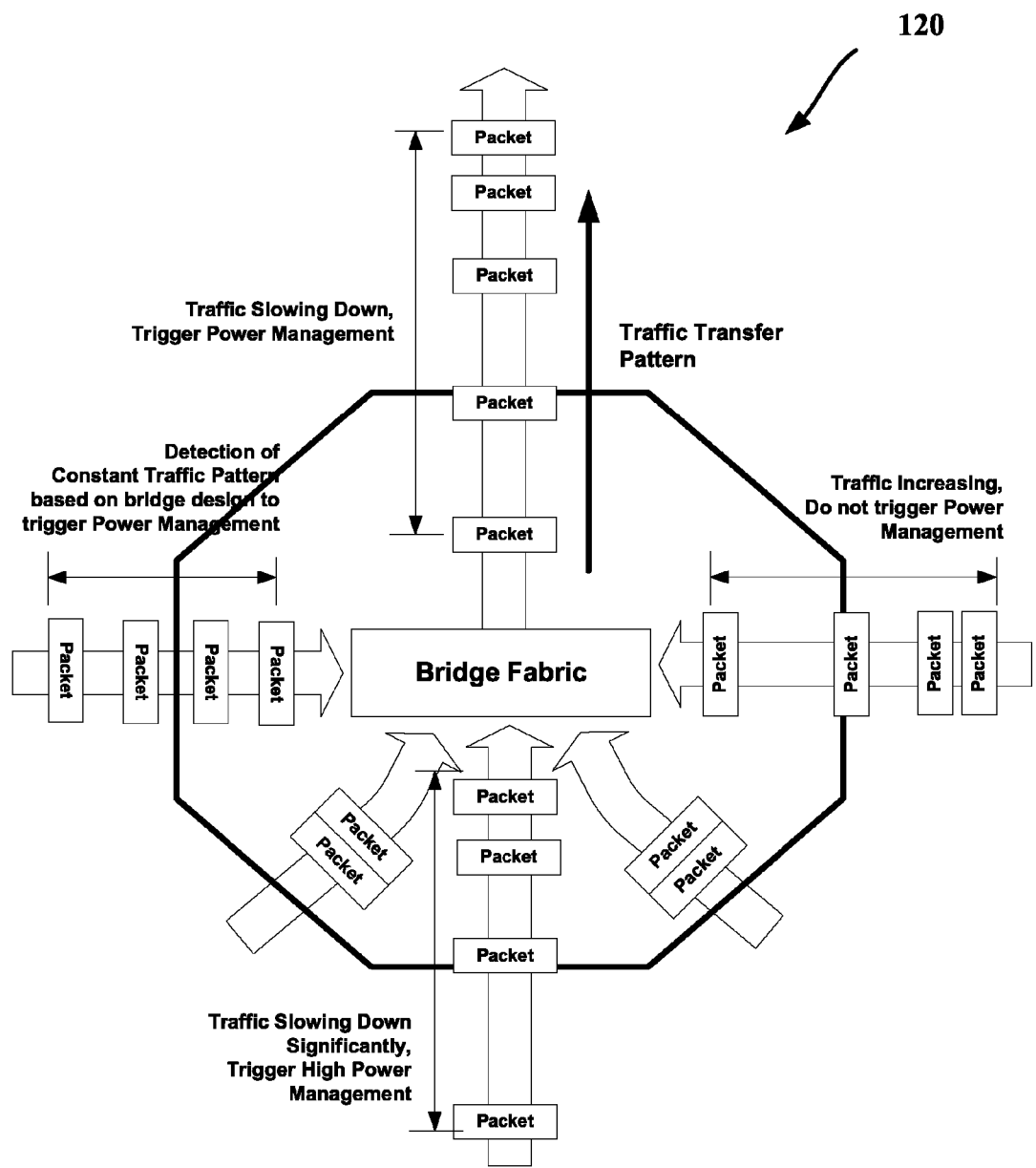
FIG. 6 illustrates a bridge fabric and various traffic patterns that may or may not trigger power management features, according to an embodiment.

FIG. 6 illustrates a bridge fabric and various traffic patterns that may or may not trigger power management features, according to an embodiment. As shown, based on analysis of successive packets, power management features may be triggered (e.g., by logic 500) in a bridge (e.g., bridge 120). For example, constant/increasing/decreasing traffic may or may not various power management features. Also, as discussed previously, if traffic is slowing down significantly, a higher power management state may be entered (e.g., bypassing other intermediate power states between the current power state and the high power management state).

Figure 7:
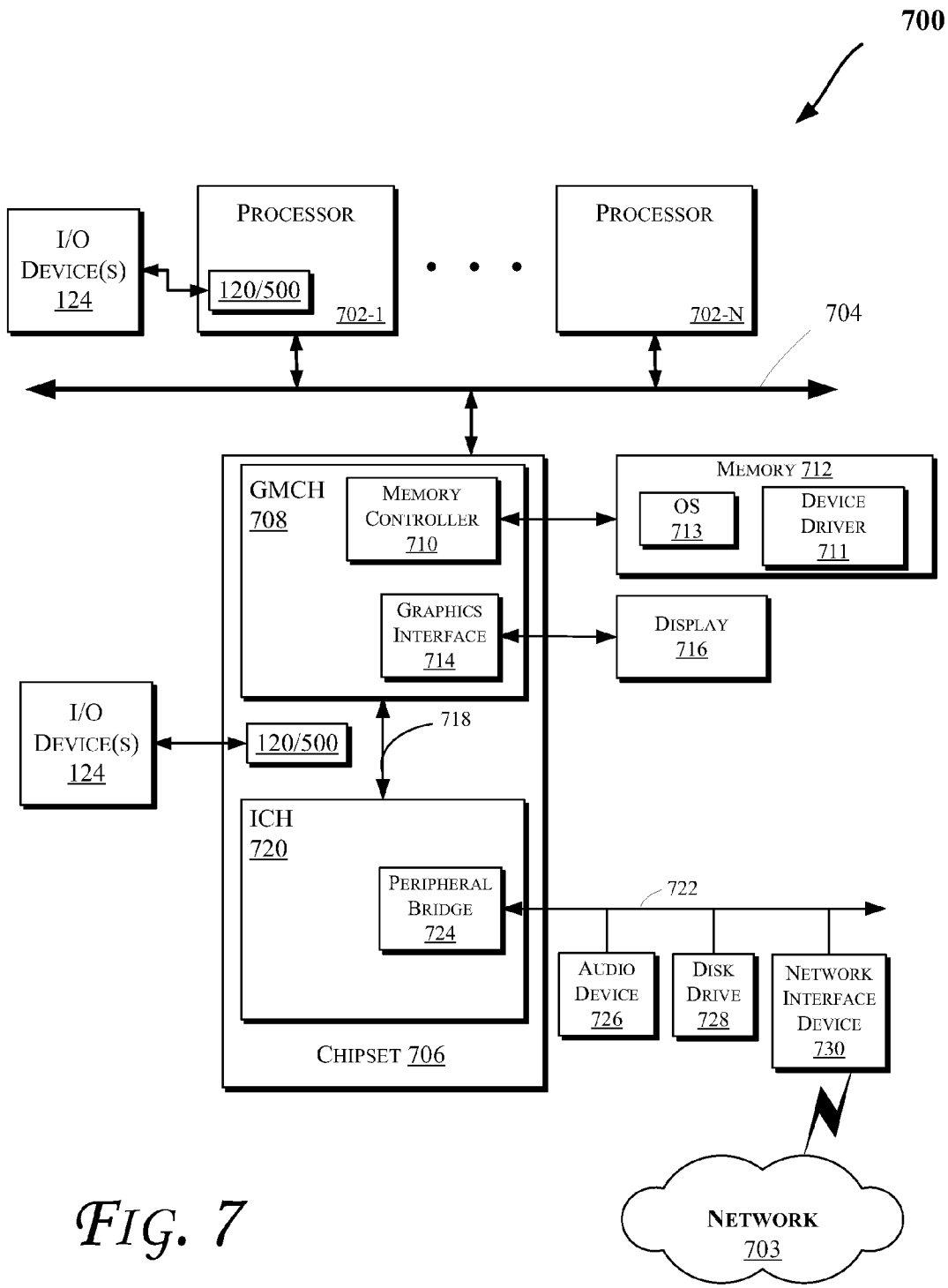

FIG. 7 illustrates a block diagram of a computing system 700 in accordance with an embodiment of the invention. The computing system 700 may include one or more central processing unit(s) (CPUs) 702-1 through 702-N or processors (collectively referred to herein as "processors 702" or more generally "processor 702") that communicate via an interconnection network (or bus) 704. The processors 702 may include a general purpose processor, a network processor (that processes data communicated over a computer network 703), or other types of a processor (including a reduced instruction set computer (RISC) processor or a complex instruction set computer (CISC)). Moreover, the processors 702 may have a single or multiple core design. The processors 702 with a multiple core design may integrate different types of processor cores on the same integrated circuit (IC) die. Also, the processors 702 with a multiple core design may be implemented as symmetrical or asymmetrical multiprocessors.

Also, the operations discussed with reference to FIGS. 1-6 may be performed by one or more components of the system 700. In some embodiments, the processors 702 may be the same or similar to the processors 202-208 of FIG. 2. Furthermore, the processors 702 (or other components of the system 700) may include one or more of the bridge(s) 120 and/or logic 500. Moreover, even though FIG. 7 illustrates some locations for items 120/500, these components may be located elsewhere in system 700. Similarly, I/O device(s) 124 may communicate via bus 722, etc.

A chipset 706 may also communicate with the interconnection network 704. The chipset 706 may include a graphics and memory controller hub (GMCH) 708. The GMCH 708 may include a memory controller 710 that communicates with a memory 712. The memory 712 may store data, including sequences of instructions that are executed by the CPU 702, or any other device included in the computing system 700. For example, the memory 712 may store data corresponding to an operation system (OS) 713 and/or a device driver 711 as discussed with reference to the previous figures. In an embodiment, the memory 712 and memory 140 of FIG. 1 may be the same or similar. In one embodiment of the invention, the memory 712 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk. Additional devices may communicate via the interconnection network 704, such as multiple CPUs and/or multiple system memories.

Additionally, one or more of the processors 702 may have access to one or more caches (which may include private and/or shared caches in various embodiments) and associated cache controllers (not shown). The cache(s) may adhere to one or more cache coherent protocols. The cache(s) may store data (e.g., including instructions) that are utilized by one or more components of the system 700. For example, the cache may locally cache data stored in a memory 712 for faster access by the components of the processors 702. In an embodiment, the cache (that may be shared) may include a mid-level cache and/or a last level cache (LLC). Also, each processor 702 may include a level 1 (L1) cache. Various components of the processors 702 may communicate with the cache directly, through a bus or interconnection network, and/or a memory controller or hub.

The GMCH 708 may also include a graphics interface 714 that communicates with a display device 716, e.g., via a graphics accelerator. In one embodiment of the invention, the graphics interface 714 may communicate with the graphics accelerator via an accelerated graphics port (AGP). In an embodiment of the invention, the display 716 (such as a flat panel display) may communicate with the graphics interface 714 through, for example, a signal converter that translates a digital representation of an image stored in a storage device such as video memory or system memory into display signals that are interpreted and displayed by the display 716. The display signals produced by the display device may pass through various control devices before being interpreted by and subsequently displayed on the display 716.

A hub interface 718 may allow the GMCH 708 and an input/output control hub (ICH) 720 to communicate. The ICH 720 may provide an interface to I/O devices that communicate with the computing system 700. The ICH 720 may communicate with a bus 722 through a peripheral bridge (or controller) 724, such as a peripheral component interconnect (PCI) bridge, a universal serial bus (USB) controller, or other types of peripheral bridges or controllers. The bridge 724 may provide a data path between the CPU 702 and peripheral devices. Other types of topologies may be utilized. Also, multiple buses may communicate with the ICH 720, e.g., through multiple bridges or controllers. Moreover, other peripherals in communication with the ICH 720 may include, in various embodiments of the invention, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 722 may communicate with an audio device 726, one or more disk drive(s) 728, and a network interface device 730 (which is in communication with the computer network 703). Other devices may communicate via the bus 722. Also, various components (such as the network interface device 730) may communicate with the GMCH 708 in some embodiments of the invention. In addition, the processor 702 and one or more components of the GMCH 708 and/or chipset 706 may be combined to form a single integrated circuit chip (or be otherwise present on the same integrated circuit die).

Furthermore, the computing system 700 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 728), a floppy disk, a compact disk ROM (CD-ROM), a digital versatile disk (DVD), flash memory, a magneto-optical disk, or other types of nonvolatile machine-readable media that are capable of storing electronic data (e.g., including instructions).

Figure 8:
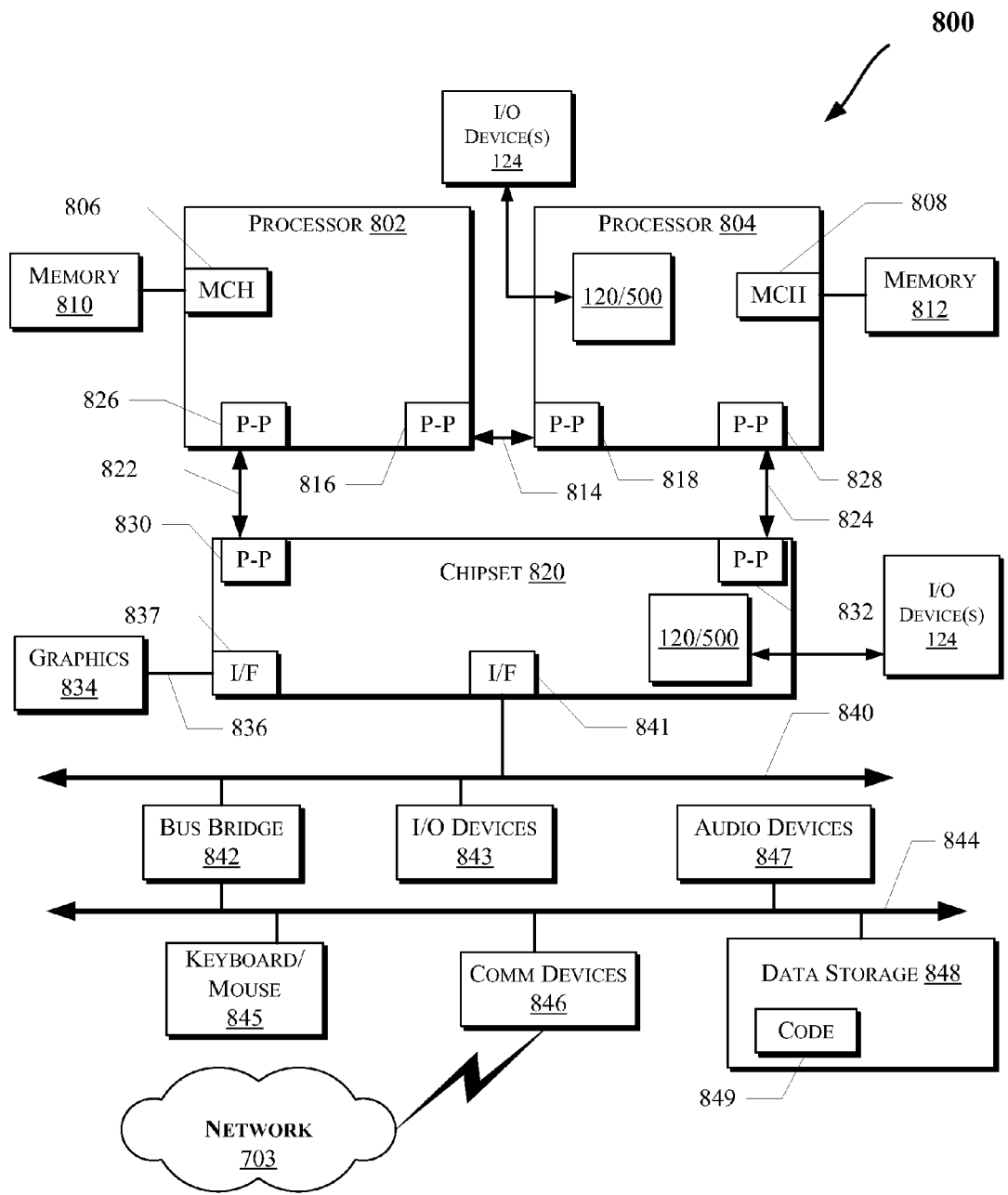

FIG. 8 illustrates a computing system 800 that is arranged in a point-to-point (PtP) configuration, according to an embodiment of the invention. In particular, FIG. 8 shows a system where processors, memory, and input/output devices are interconnected by a number of point-to-point interfaces. The operations discussed with reference to FIGS. 1-7 may be performed by one or more components of the system 800.

As illustrated in FIG. 8, the system 800 may include several processors, of which only two, processors 802 and 804 are shown for clarity. The processors 802 and 804 may each include a local memory controller hub (MCH) 806 and 808 to enable communication with memories 810 and 812. The memories 810 and/or 812 may store various data such as those discussed with reference to the memory 712 of FIG. 7. As shown in FIG. 8, the processors 802 and 804 may also include the cache(s) discussed with reference to FIG. 7.

In an embodiment, the processors 802 and 804 may be one of the processors 702 discussed with reference to FIG. 7. The processors 802 and 804 may exchange data via a point-to-point (PtP) interface 814 using PtP interface circuits 816 and 818, respectively. Also, the processors 802 and 804 may each exchange data with a chipset 820 via individual PtP interfaces 822 and 824 using point-to-point interface circuits 826, 828, 830, and 832. The chipset 820 may further exchange data with a high-performance graphics circuit 834 via a high-performance graphics interface 836, e.g., using a PtP interface circuit 837.

At least one embodiment of the invention may be provided within the processors 802 and 804 or chipset 820. For example, the processors 802 and 804 and/or chipset 820 may include one or more of the bridge(s) 120, and/or logic 500. Other embodiments of the invention, however, may exist in other circuits, logic units, or devices within the system 800 of FIG. 8. Furthermore, other embodiments of the invention may be distributed throughout several circuits, logic units, or devices illustrated in FIG. 8. Hence, location of items 120/500 shown in FIG. 8 is exemplary and these components may or may not be provided in the illustrated locations.

The chipset 820 may communicate with a bus 840 using a PtP interface circuit 841. The bus 840 may have one or more devices that communicate with it, such as a bus bridge 842 and I/O devices 843. Via a bus 844, the bus bridge 842 may communicate with other devices such as a keyboard/mouse 845, communication devices 846 (such as modems, network interface devices, or other communication devices that may communicate with the computer network 703), audio I/O device, and/or a data storage device 848. The data storage device 848 may store code 849 that may be executed by the processors 802 and/or 804.

In various embodiments of the invention, the operations discussed herein, e.g., with reference to FIGS. 1-8, may be implemented as hardware (e.g., circuitry), software, firmware, microcode, or combinations thereof, which may be provided as a computer program product, e.g., including a (e.g., non-transitory) machine-readable or (e.g., non-transitory) computer-readable medium having stored thereon instructions (or software procedures) used to program a computer to perform a process discussed herein. Also, the term "logic" may include, by way of example, software, hardware, or combinations of software and hardware. The machine-readable medium may include a storage device such as those discussed with respect to FIGS. 1-8. Additionally, such computer-readable media may be downloaded as a computer program product, wherein the program may be transferred from a remote computer (e.g., a server) to a requesting computer (e.g., a client) by way of data signals transmitted via a carrier wave or other propagation medium via a communication link (e.g., a bus, a modem, or a network connection).

Reference in the specification to "one embodiment" or "an embodiment" means that a particular feature, structure, or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. An apparatus comprising:
    a plurality of storage devices to store a plurality of values corresponding to received packets;

first logic to determine first derivative values based on the plurality of values corresponding to the received packets; and second logic to determine a second derivative value based on the first derivative values, wherein a bridge is to enter a different power management state from a current power management state based on the second derivative value, wherein the plurality of values corresponding to the received packets are to be expressed as a mathematical function corresponding to arrival time of received packets at the bridge versus a number of the received packets at the bridge and the first derivative values are to be determined as a mathematical derivative of the mathematical function.

2. The apparatus of claim 1, wherein the bridge is to enter the different power management state directly and without entering one or more intermediate power management states between the current power management state and the different power management state.

3. The apparatus of claim 1, further comprising a counter to count a number of periods between the received packets, wherein the plurality of values stored in the plurality of storage devices correspond to the number of periods between the received packets.

4. The apparatus of claim 3, wherein the counter is to be reset in response to receipt of a new packet.

5. The apparatus of claim 1, further comprising a second plurality of storage devices to store a plurality of second derivative values generated by the second logic.

6. The apparatus of claim 1, wherein the bridge is to comprise at least the first logic, the second logic, or the plurality of storage devices.

7. The apparatus of claim 1, wherein a first agent is coupled to a second agent via the bridge.

8. The apparatus of claim 7, wherein one of the first or second agents is to comprise one or more of: a chipset, one or more processor cores, or a memory controller.

9. The apparatus of claim 7, wherein the second agent is to comprise an input/output device.

10. The apparatus of claim 7, wherein a link is to couple two or more of the first agent, the second agent, and the bridge, wherein the link is to comprise a point-to-point coherent interconnect.

11. The apparatus of claim 1, wherein one or more of the first logic, the second logic, and the plurality of storage devices are on a same integrated circuit chip.

12. A method comprising:

storing a plurality of values corresponding to received packets in a plurality of storage devices;

determining first derivative values based on the plurality of values corresponding to the received packets; and determining a second derivative value based on the first derivative values, wherein a bridge is to enter a different power management state from a current power management state based on the second derivative value, wherein the plurality of values corresponding to the received packets are expressed as a mathematical function corresponding to arrival time of received packets at the bridge versus a number of the received packets at the bridge and the first derivative values are determined as a mathematical derivative of the mathematical function.

13. The method of claim 12, further comprising the bridge entering the different power management state directly and without entering one or more intermediate power management states between the current power management state and the different power management state.

14. The method of claim 12, further comprising counting a number of periods between the received packets, wherein the plurality of values stored in the plurality of storage devices correspond to the number of periods between the received packets.

15. The method of claim 12, further comprising storing a plurality of second derivative values in a second plurality of storage devices.

16. A computing system comprising:

a processor core coupled to an input/output device via a bridge;

a plurality of storage devices to store a plurality of values corresponding to received packets;

first logic to determine first derivative values based on the plurality of values corresponding to the received packets; and second logic to determine a second derivative value based on the first derivative values, wherein the bridge is to enter a different power management state from a current power management state based on the second derivative value, wherein the plurality of values corresponding to the received packets are to be expressed as a mathematical function corresponding to arrival time of received packets at the bridge versus a number of the received packets at the bridge and the first derivative values are to be determined as a mathematical derivative of the mathematical function.

17. The system of claim 16, wherein the bridge is to enter the different power management state directly and without entering one or more intermediate power management states between the current power management state and the different power management state.

18. The system of claim 16, further comprising a counter to count a number of periods between the received packets, wherein the plurality of values stored in the plurality of storage devices correspond to the number of periods between the received packets.

19. The system of claim 16, further comprising a second plurality of storage devices to store a plurality of second derivative values generated by the second logic.

20. The system of claim 16, wherein one or more of the processor, the first logic, the second logic, and the plurality of storage devices are on a same integrated circuit chip.

* * * * *